(12) United States Patent
Miyazaki (10) Patent No.: US 7,428,384 B2
(45) Date of Patent: Sep. 23, 2008

(54) OPTICAL ROUTER

(75) Inventor: Tetsuya Miyazaki, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 620 days.

(21) Appl. No.: 11/025,278

(22) Filed: Dec. 28, 2004

(65) Prior Publication Data

US 2005/0152698 A1   Jul. 14, 2005

(30) Foreign Application Priority Data

Jan. 14, 2004   (JP) ............... 2004-007288

(51) Int. Cl.
*H04J 14/00* (2006.01)
(52) U.S. Cl. .................. 398/49; 398/45; 398/48
(58) Field of Classification Search ............ 398/49
See application file for complete search history.

(56) References Cited

U.S. PATENT DOCUMENTS

| | | | | | |
|---|---|---|---|---|---|
| 5,825,519 | A | * | 10/1998 | Prucnal | 398/98 |
| 5,864,413 | A | * | 1/1999 | Feldman et al. | 398/72 |
| 5,999,293 | A | * | 12/1999 | Manning | 398/52 |
| 6,188,511 | B1 | * | 2/2001 | Marcenac et al. | 359/344 |
| 6,438,295 | B1 | * | 8/2002 | McGarry et al. | 385/39 |
| 6,532,099 | B2 | * | 3/2003 | Fuse | 359/278 |
| 7,024,115 | B2 | * | 4/2006 | Ishimaru | 398/57 |
| 2002/0015552 | A1 | * | 2/2002 | Link et al. | 385/24 |
| 2002/0131675 | A1 | * | 9/2002 | Litvin | 385/16 |
| 2004/0131046 | A1 | * | 7/2004 | Kim et al. | 370/351 |
| 2005/0180750 | A1 | * | 8/2005 | Wada et al. | 398/49 |
| 2007/0086780 | A1 | * | 4/2007 | Islam | 398/45 |

OTHER PUBLICATIONS

S. Nakamura, K. Tajima, and Y. Sugimoto. "Experimental investigation. on high-speed switching characteristics of a novel symmetric Mach-Zehnder ail-optical switch". Appl. Phys. Lett. 65 (3), Jul. 18, 1994.*

Y. Ueno et al, "Nonlinear phase shifts induced by semiconductor optical amplifiers with control pulses at repetition frequencies in the 40-160 GHz range for use in ultrahigh-speed all-optical signal processing"; J. Opt. Soc. Am. B, vol. 19, No. 11, Nov. 2002, pp. 2573-2589.

(Continued)

*Primary Examiner*—Kenneth Vanderpuye
*Assistant Examiner*—Thi Le
(74) *Attorney, Agent, or Firm*—Christie, Parker & Hale, LLP (57) ABSTRACT

According the invention, a multiplexed light composed of a signal light of a signal wavelength, and a first route control light of a first route control wavelength different from the signal wavelength or a second route control light of a second route control wavelength different from the signal light and the first route control wavelength is incident to a demultiplexer. The demultiplexer demultiplexes the signal light of the signal wavelength, the first route control light, and the second route control light from the multiplexed light. An interferometer optical switch outputs the signal light from first output port according to the first route control light, and outputs the signal light from second output port according to the second route control light.

11 Claims, 5 Drawing Sheets

OTHER PUBLICATIONS

Y. Sugimoto et al, "Fabrication and characterization of different types of two-dimensional AlGa As photonic crystal slabs"; Journal of Applied Physics; vol. 91, No. 3, Feb. 1, 2002, pp. 922-929.

Prucnal, "Optically Processed Self-Routing, Synchronization, and Contention Resolution for 1-D and 2-D Photonic Switching Architectures," IEEE Journal of Quantum Electronics, vol. 29, No. 2, Feb. 1993, pp. 600-612.

Park, et al., "Self-Routing of Wavelength Packets Using an All-Optical Wavelength Shifter and QPSK Subcarrier Routing Control Headers," IEEE Photonics Technology Letters, vol. 8, No. 7, Jul. 1996, pp. 938-940.

Schubert, et al., "Comparison of Interferometric All-Optical Switches for Demultiplexing Applications in High-Speed OTDM Systems," 2002 IEEE, Journal of Lightwave Technology, vol. 20, No. 4, Apr. 2002, pp. 618-624.

Takemori, et al., "A Scheduling Algorithm for 2+2 Buffered Switch in a Photonic Packet Switch," Information Processing Society of Japan, Technical Report "High Quality Internet," UPSH-QAU01002006, No. 002-006.2001, English Abstract.

* cited by examiner

OPTICAL ROUTER

CROSS REFERENCE TO RELATED APPLICATIONS

This application claims priority to Japanese Patent Application No. 2004-007288, filed Jan. 14, 2004, the entire contents of which are incorporated herein by reference.

FIELD OF THE INVENTION

This invention relates to an optical router for realizing self-routing of signal lights.

BACKGROUND OF THE INVENTION

Methods for realizing self-routing of optical packets are described in Paul R. Prucnal, "Optically Processed Self-Routing, Synchronization, and Contention resolution for 1-D and 2-D photonic Switching Architectures," IEEE Journal of Quantum Electronics, Vol. 29, No. 2, pp. 600-612, Feb. 1993, and Eugene Park et al., "Self-Routing of Wavelength Packets Using an All-Optical Wavelength Shifter and QPSK Subcarrier Routing Control Headers," IEEE Photonics Technology Letters, Vol. 8, No. 7, pp. 938-940, Jul. 1996. In those methods, routes of optical packets are determined according to the results obtained by analyzing headers of the optical packets.

In prior art, routing methods for electric signals are diverted for optical signals. Accordingly, it is necessary to convert optical signals into electric signals to analyze their optical headers. As a result, some problems are brought about such that a complicated and high-speed electric circuit must be disposed in a node, it is difficult to realize the fast operation, and it is unlikely to realize quick self-routing.

SUMMARY OF THE INVENTION

An optical router according to one embodiment of the invention includes a multiplexed light input port to which a multiplexed light enters, the multiplexed light comprises a signal light of a signal wavelength, and a first route control light of a first route control wavelength different from the signal wavelength or a second route control light of a second route control wavelength different from the signal wavelength and the first route control wavelength, a demultiplexer to demultiplex the signal light of the signal wavelength and the first and the second route control lights from the multiplexed light, and an interferometer optical switch having a first arm, a second arm, a first optical phase modulator disposed on the first arm, a second optical phase modulator disposed on the second arm, a first output port, and a second output port, wherein the interferometer is configured applying the signal light and the first route control light from the demultiplexer to the first optical phase modulator, applying the signal light and the second route control light from the demultiplexer to the second optical phase modulator, outputs the signal light through the first output port according to the first route control light, and outputs the signal light through the second output port according to the second route control light.

According to embodiments of the invention, self-routing of signal lights can be realized with a simple configuration. It is not necessary for optical routers to include a function for analyzing optical headers and therefore the configuration of optical routers can be simplified.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
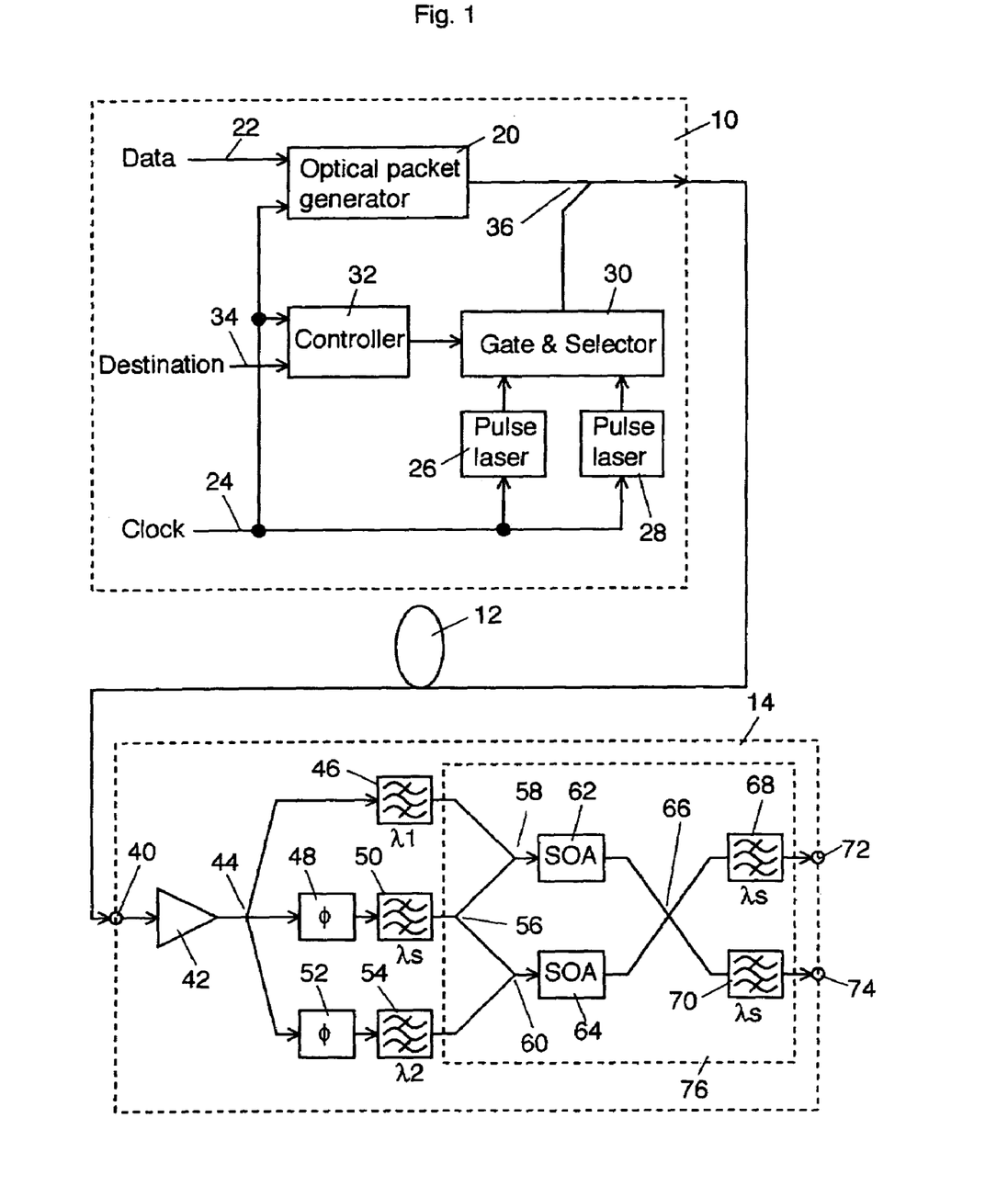
FIG. 1 is a schematic block diagram of a first explanatory embodiment according to the invention.

FIG. 1 shows a schematic block diagram of a first explanatory embodiment according to the invention, and FIGS. 2(a)-2(g) show waveform examples of the first embodiment.

An optical signal generator 10 generates an optical packet having a control light (route control light) for self-routing. An output light of the optical signal generator 10 propagates in an optical fiber transmission line 12 and enters an optical router 14. In this embodiment, an optical packet includes an optical burst and an optical header includes an optical label.

Figures 2A, 2B:
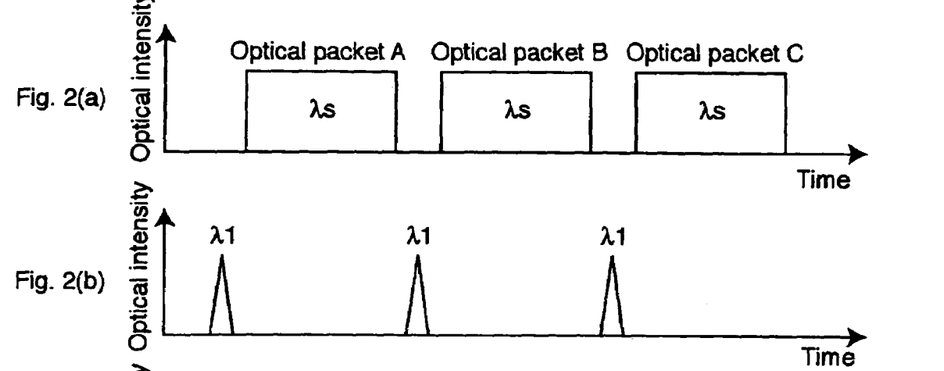
FIGS. 2(a)-2(g) show waveform examples of the first embodiment.
Figure 2C:
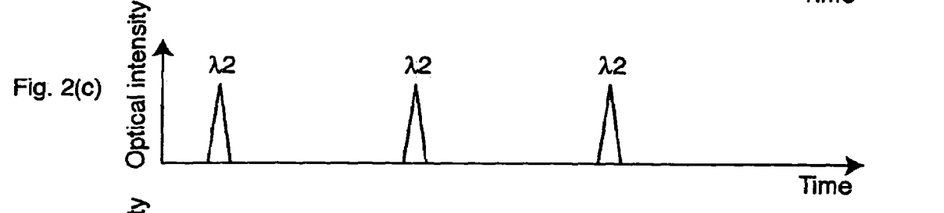

The configuration and operation of the optical signal generator 10 is explained below. An optical packet generator 20 generates optical packets A, B, C . . . of a wavelength $\tau s$ to carry a data 22 according to the data 22 and a clock 24. FIG. 2(a) shows waveform examples of optical packets A, B and C. Pulse lasers 26 and 28 generate pulse laser lights having a control period of the optical router 14 according to the clock 24. FIGS. 2(b) and 2(c) respectively shows waveform examples of pulse laser lights from the pulse lasers 26 and 28. However, the pulse laser 26 generates a laser pulse of a wavelength $\lambda 1$, and the pulse laser 28 generates a pulse laser of a wavelength $\lambda 2$. The output lights of the pulse lasers 26 and 28 enter a gate & selector 30. The wavelengths $\lambda s$, $\lambda 1$, and $\lambda 2$ are different from one another.

Figure 2D:
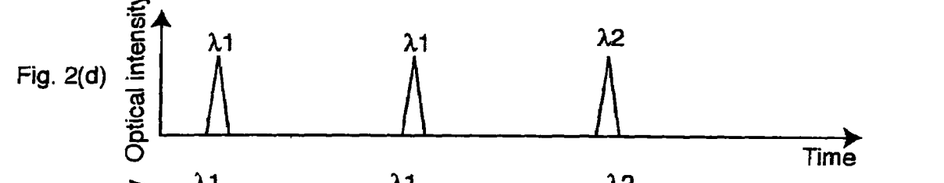

A controller 32 controls the gate & selector 30 according to destination information 34 indicating a destination of each packet generated by the optical packet generator 20. Here, destinations of optical packets A and B are the same while a destination of an optical packet C is different to those of the optical packets A and B. The controller 32 selectively transmits a route control light of the wavelength $\lambda 1$ for the optical packet A, selectively transmits a route control light of the wavelength $\lambda 1$ for the optical packet B, and selectively transits a route control light of the wavelength $\lambda 2$ for the optical packet C. FIG. 2(d) shows route control lights output from the gate & selector 30. A wavelength division multiplexing (WDM optical coupler 36 couples a signal light (FIG. 2(a)) output from the optical packet generator 20 with a route control light (FIG. 2(d)) output from the gate & selector 30.

Figure 2E:
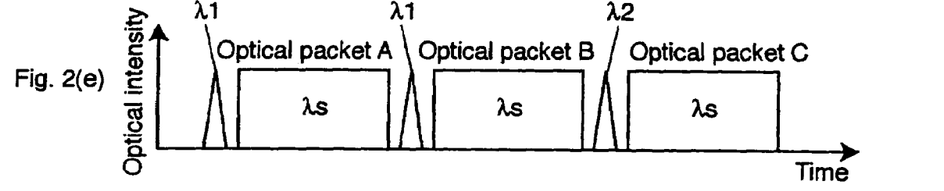

An output light of the WDM optical coupler 36, which is exactly an output light of the optical signal generator 10, enters an input port 40 in the optical router 14 after propagating in the optical fiber transmission line 12. FIG. 2(e) shows a waveform example of the output light from the WDM optical coupler 36.

The optical router 14 basically includes an optical switch using a Mach-Zehnder interferometer (MZI) with a semiconductor optical amplifier on its each arm. Although such MZI optical switches are well known in the art, the mentioned embodiment is characterized in that an MZI optical switch is used in flipflopped operation.

A light entered the input port 40 is amplified by an optical amplifier 42 and split by a splitter 44 into three portions. A first portion of the split lights enters an optical bandpass filter 46 that transmits the wavelength $\lambda 1$ while blocking the wavelengths $\lambda 2$ and $\lambda s$. A second portion of the split lights enters an optical bandpass filter 50, that transmits the wavelength $\lambda s$ while blocking the wavelengths $\lambda 1$ and $\lambda 2$, via a phase adjuster 48. A third portion of the split lights enters an optical bandpass filter 54, that transmits the wavelength $\lambda 2$ while blocking the wavelengths $\lambda s$ and $\lambda 1$, via a phase adjuster 52. Optical packets A, B, C, ... of the wavelength $\lambda s$, a route control light of the wavelengths $\lambda 1$, and a route control light of the wavelength $\lambda 2$ are separated from one another by the splitter 44 and the optical bandpass filters 46, 50, and 54. The phase adjusters 48 and 52 are disposed to substantially equalize optical lengths of the optical paths on which the optical bandpass filters 46, 50, and 54 are disposed. After the optical lengths of the optical paths are equalized, the amount of phase adjusting of the phase adjusters 48 and 52 are kept to a constant level. When it is assured in manufacturing process that optical lengths of respective optical paths are equal to each other, the phase modulators 48 and 52 can be omitted.

A splitter 56 splits an optical output (optical packet) from the optical bandpass filter 50 into two portions. A coupler 58 couples an output light (route control light of the wavelength $\lambda 1$) from the optical bandpass filter 46 and one portion (optical packet) of the split lights from the splitter 56 and applies the coupled light to a semiconductor optical amplifier (SOA) 62. Although it is not illustrated in FIG. 1, the SOA 62 is applied by a constant bias and set to vary an optical phase of a signal light of the wavelength $\lambda s$ by $\pi$ through cross phase modulation (XPM) when a control light of the wavelength $\lambda 1$ exists. That is, the SOA 62 functions as a phase modulator to phase-modulate a light of the signal wavelengths $\lambda s$ according to a route control light of the wavelength $\lambda 1$.

A coupler 60 couples an output light (route control light of the wavelength $\lambda 2$) from the optical bandpass filter 54 and the other portion (optical packet) of the split lights from the splitter 56 and applies the coupled light to a semiconductor optical amplifier (SOA) 64. Similar to the SOA 62, the SOA 64 is applied by a constant bias and set to vary an optical phase of a signal light of the wavelength $\lambda s$ by $\pi$ through XPM when a control light of the wavelength $\lambda 2$ exists. That is, similar to the SOA 62, the SOA 64 functions as a phase modulator to phase-modulate a light of the signal wavelength $\lambda s$ according to a route control light of the wavelength $\lambda 2$.

A coupler/splitter 66 couples optical outputs from the SOAs 62 and 64 and splits the coupled light into two portions. The coupler/splitter 66 applies one portion of the split lights to an optical bandpass filter 68 that transmits the signal wavelengths $\lambda s$ while blocking the route control wavelengths $\lambda 1$ and $\lambda 2$. The coupler/splitter 66 applies the other portion of the split lights to an optical bandpass filter 70 that transmits the signal wavelengths $\lambda s$ while blocking the route control wavelengths $\lambda 1$ and $\lambda 2$. An optical output of the optical bandpass filter 68 is sent to the outside from an output port 72 of the optical router 14. An optical output of the optical bandpass filter 70 is sent to the outside from an optical output port 74 of the optical router 14.

When a light as shown in FIG. 2(e) enters the input port 40, the SOA 62 shifts an optical phase of an optical packet A by $\pi$ since a route control light of the wavelength $\lambda 1$ inputs the SOA 62 immediately before the optical packet A of the signal wavelength $\lambda s$. On the other hand, the SOA 64 transmits an optical packet A without shifting its optical phase since a route control light of the wavelength $\lambda 2$ does not enter the SOA 64 immediately before the optical packet A. As a result, two optical packets A, one is having an optical phase $\pi$ from the SOA 62 and the other is having an optical phase 0 from the SOA 64, enter the coupler/splitter 66. The coupler/splitter 66 applies optical packet A exclusively to the optical bandpass filter 68 because of interference effects between both input lights. Similarly, the coupler/splitter 66 outputs optical packet B exclusively to the bandpass filter 68.

The SOA 62 transmits an optical packet C without shifting its optical phase since a route control light of the wavelength $\lambda 1$ does not enter the SOA 62 immediately before the optical packet C. On the other hand, the SOA 64 shifts an optical phase of an optical packet C by $\pi$ since a route control light of the wavelength $\lambda 2$ enters the SOA 64 immediately before the optical packet C. As a result, two optical packets C, one is having an optical phase 0 from the SOA 62 and the other is having an optical phase $\pi$ from the SOA 64, enter the coupler/splitter 66. Optical phases of the optical packets C are the reverse of those of the optical packets A and B. The coupler/splitter 66 outputs optical packet C exclusively to the optical bandpass filter 70 because of interference effects between both input lights.

The splitter 56, the couplers 58 and 60, semiconductor optical amplifiers 62 and 64 on both arms, the coupler/splitter 66, and the optical bandpass filters 68 and 70 are composed of a Mach-Zehnder interferometer (MZI) optical switch 76. Route control lights of the wavelengths $\lambda 1$ and $\lambda 2$ function as switch control lights for the MZI optical switch 76.

Figure 2F:
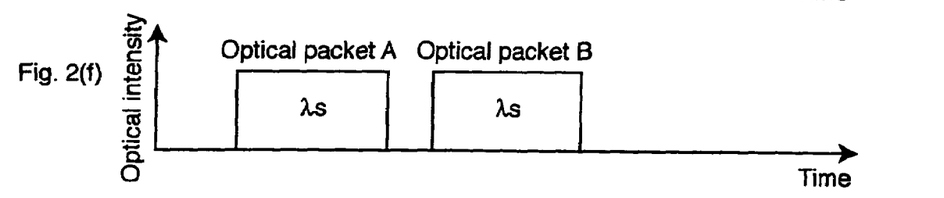
Figure 2G:
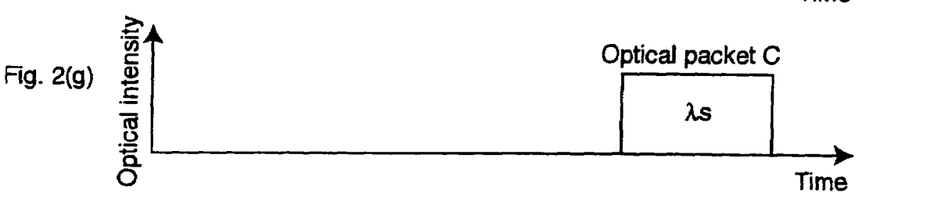
Figures 3A, 3B, 3C, 3D:
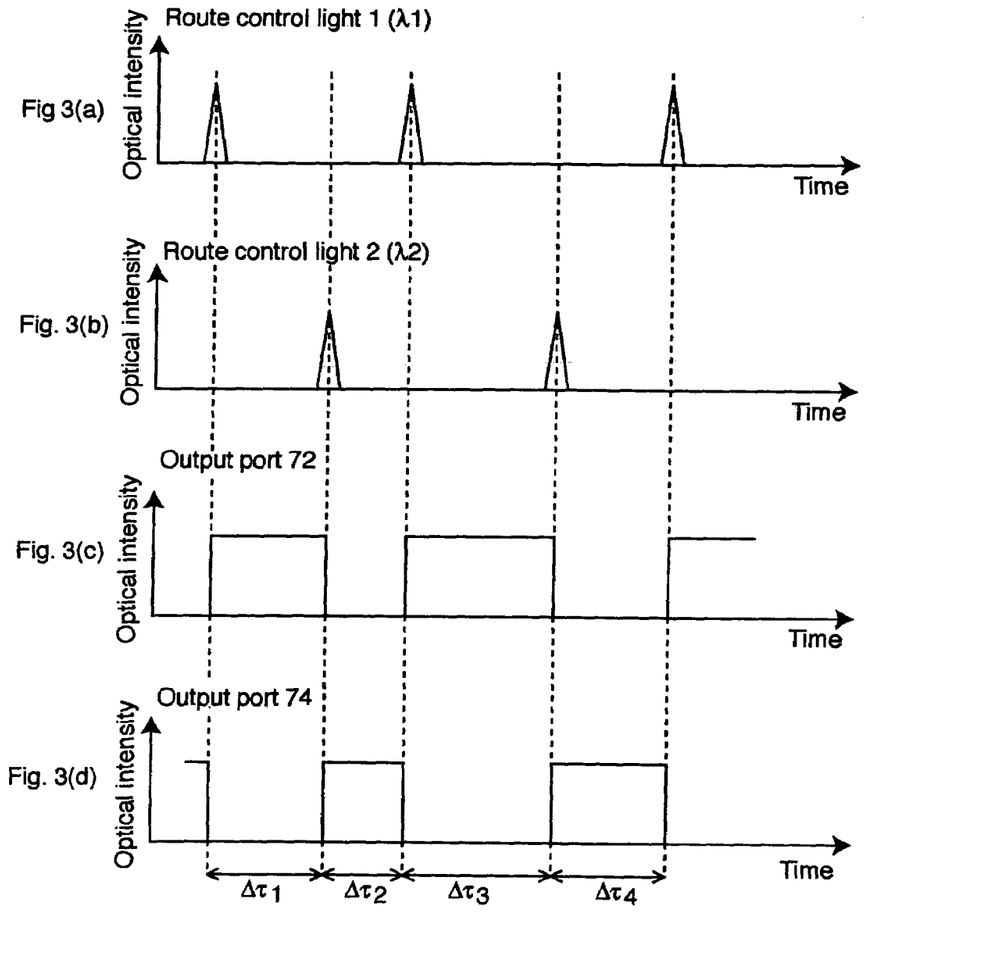
FIGS. 3(a)-3(d) show waveforms to explain a switching function of an MZI optical switch in such a case that a carrier relaxation time $\tau c$ of semiconductor optical amplifiers is longer than a maximum duration time $\Delta \tau max$ of the MZI optical switch.
Figure 4A:
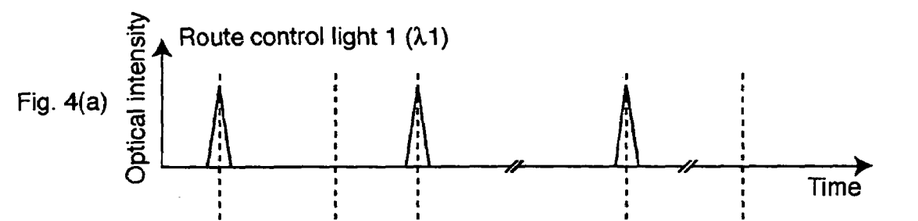
FIGS. 4(a)-4(d) show waveforms to explain a switching function of the MZT optical switch in such a case that a carrier relaxation time $\tau c$ is shorter than $\Delta \tau max$.
Figure 4B:
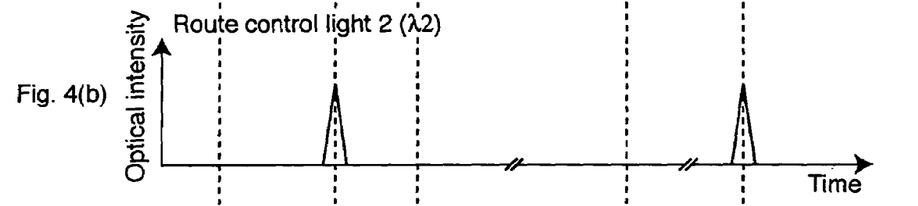
Figure 4C:
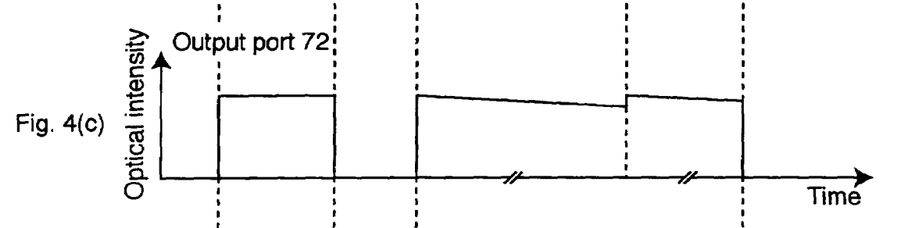
Figure 4D:
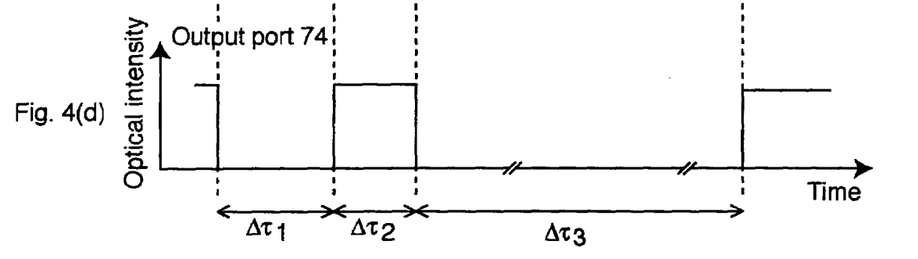

With the above operations, the optical router 14 outputs optical packets A and B from its output port 72 as shown in FIG. 2(f) and outputs an optical packet C from its output port 74 as shown in FIG. 2(g). According to this embodiment, an output destination of an optical packet can be controlled by a route control light propagating in an optical transmission line, which is physically identical to the one in which a signal light propagates.

In FIGS. 2(a)-2(g), to make it more understandable, a route control light is illustrated temporally prior to an optical packet. Since the wavelengths $\lambda 1$ and $\lambda 2$ of a route control light are different to the wavelengths $\lambda s$ of an optical packet, the controller 32 can multiplexes a route control light at almost the same time with a tip of the optical packet.

In addition, in the embodiment shown in FIG. 1, it is set forth that a length of an optical packet generated by the optical packet generator 20 is fixed. When a length of an optical packet is irregular, the controller 32 controls the generating timing of route control optical pulses by the pulse lasers 26 and 28 according to a length of an optical packet generated by the optical packet generator 20.

An effective time period that a route control light can control the SOAs 62 and 64 is determined according to relaxation time of the XPM of the SOAs 62 and 64.

FIGS. 3(a)-3(d) show an example of a timing chart when carrier relaxation time $\tau c$ of the SOAs 62 and 64 is longer than a maximum duration time $\Delta\tau max$ of an output of the SOAs 62 and 64 toward one of the output ports and FIGS. 4(a)-4(d) show an example of a timing chart when $\tau c$ is shorter than Δτmax. When a route control light (switch control light) of the wavelength λ1 inputs the MZI optical switch 76, the MZI optical switch 76 transmits the input signal light to the output port 72. When a route control light (switch control light) of the wavelength λ2 inputs the MZI optical switch 76, the MZI optical switch 76 transmits the input signal light to the output port 74. In FIGS. 3(a)-3(d), Δτ4 equals to Δτmax. In FIGS. 4(a)-4(d), Δτ3 equals to Δτmax and also Δτ3 is longer than τc. As schematically shown in FIGS. 4(a)-4(d), although an output level of signal light from the same output port decreases with the elapse of the carrier relaxation time τc, the output level can be maintained by inputting an another route control light at rather an early stage.

In the first embodiment, although a switch control light and a signal light enter the SOAs 62 and 64 on the arms of the MZI interferometer optical switch 76 in the same direction, it is also applicable that those two lights enter the SOAs 62 and 64 in opposite directions from each other.

Figure 5:
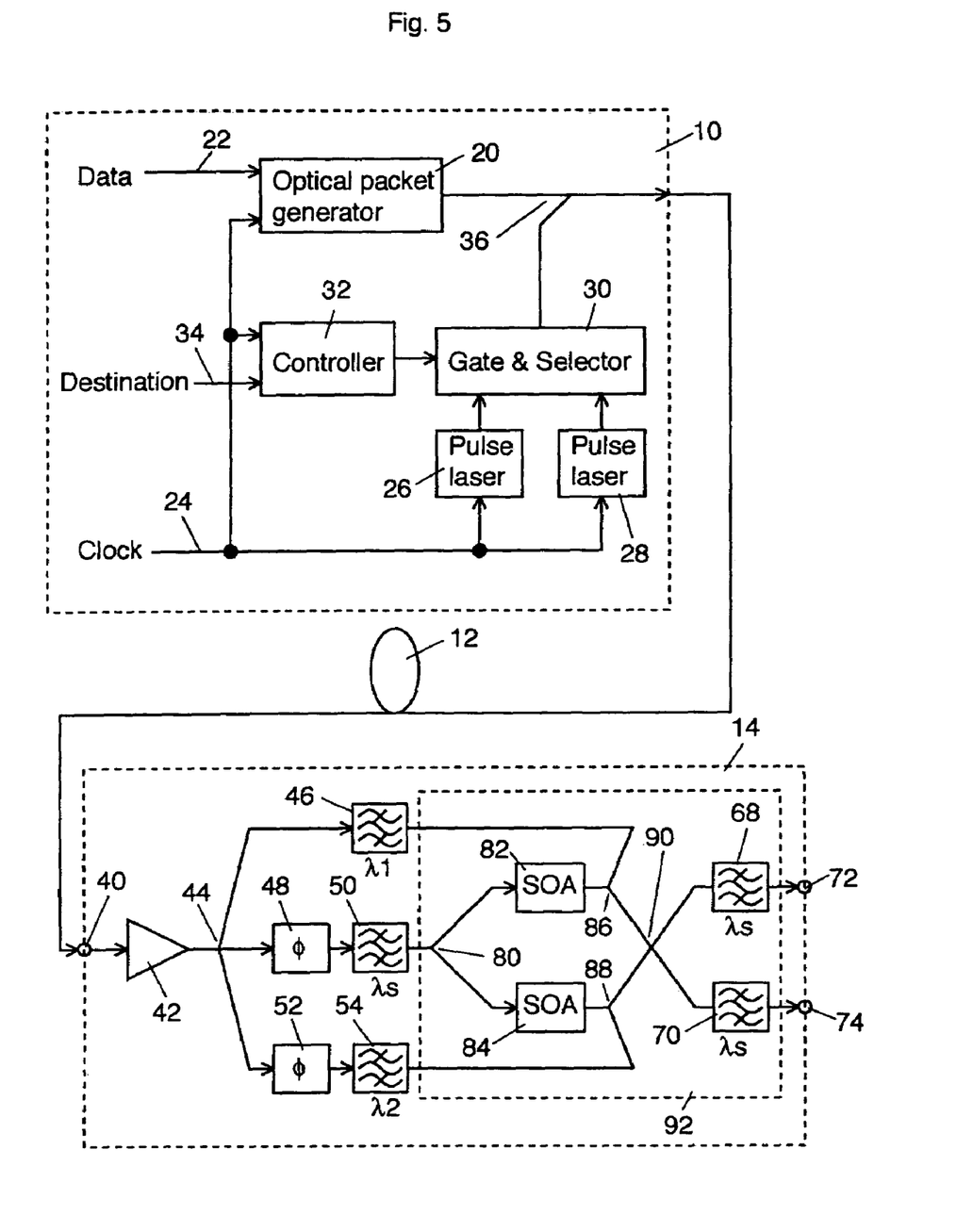
FIG. 5 is a schematic block diagram of a second explanatory embodiment according to the invention.

FIG. 5 shows a schematic block diagram in which the optical router 14 is modified according to the above description. In FIG. 5, elements common to those in FIG. 1 are labeled with the same reference numerals. Specifically, the MZI optical switch 76 is modified to an MZI optical switch 92.

The configuration and operation of the modified part is explained below. A splitter 80 splits an output light (optical packet) from the optical bandpass filter 50 into two portions and applies one portion of the split lights to an SOA 82 and the other portion to an SOA 84. An optical coupler 86 is disposed on an output side of the SOA 82. An output light (route control light of the wavelengths λ1) from the optical bandpass filter 46 enters the SOA 82 in an opposite direction to the optical packet via the optical coupler 86. Similarly, an optical coupler 88 is disposed on an output side of the SOA 84. An output light (route control light of the wavelength λ2) from the optical bandpass filter 54 enters the SOA 84 in an opposite direction to the optical packet via the optical coupler 88.

In the described MZI configuration, the time in which a signal light and a route control light interact each other in the SOAs 82 and 84 becomes shorter than that of the configuration of the optical switch 76. As a result, the above-stated Δτmax becomes substantially shorter.

A signal light phase-modulated by the SOA 82 enters a coupler/splitter 90 via the optical coupler 86 while a signal light phase-modulated by the SOA 84 enters the coupler/splitter 90 via the optical coupler 88. The coupler/splitter 90, similar to the coupler/splitter 66, outputs the signal light to the optical bandpass filter 68 or 70 according to a phase relation of the two input signal lights. The operation thereafter is the same as that of the first embodiment shown in FIG. 1.

While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical router comprising:
   a multiplexed light input port to which a multiplexed light inputs, the multiplexed light comprises a signal light of a signal wavelength, and a first route control light of a first route control wavelength different from the signal wavelength or a second route control light of a second route control wavelength different from the signal wavelength and the first route control wavelength;
   a demultiplexer to demultiplex the signal light of the signal wavelength, the first route control light, and the second route control light from the multiplexed light; and
   an interferometer optical switch having a first arm, a second arm, a first optical phase modulator disposed on the first arm, a second optical phase modulator disposed on the second arm, a first output port, and a second output port, wherein the interferometer applies the signal light and the first route control light from the demultiplexer to the first optical phase modulator, applies the signal light and the second route control light from the demultiplexer to the second optical phase modulator, outputs the signal light through the first output port according to the first route control light, and outputs the signal light through the second output port according to the second route control light,
   wherein the interferometer optical switch comprises:
      a signal light splitter to split the signal light from the demultiplexer into first and second portions and to apply the first portion to the first optical phase modulator and the second portion to the second optical phase modulator;
      a first optical coupler to apply the first route control light from the demultiplexer to the first optical phase modulator in an opposite direction to that of the first portion of the signal light from the signal light splitter;
      a second optical coupler to apply the second route control light from the demultiplexer to the second optical phase modulator in an opposite direction to that of the second portion of the signal light from the signal light splitter; and
      a coupler/splitter to couple a first light of the signal wavelength from the first optical phase modulator and a second light of the signal wavelength from the second optical phase modulator into a coupled light, to split the coupled light into split lights, and to apply one portion of the split lights to the first output port and another portion of the split lights to the second output port.

2. The optical router of claim 1, wherein the demultiplexer comprises:
   a splitter to split the multiplexed light into three split outputs;
   a first optical filter to extract a light of the first route control wavelength from a first one of the three split outputs;
   a second optical filter to extract a light of the signal wavelength from a second one of the three split outputs; and
   a third optical filter to extract a light of the second route control wavelength from a third one of the three split outputs.

3. The optical router of claim 1, wherein each of the first and the second optical phase modulators comprises a semiconductor optical amplifier.

4. An optical router comprising:
   a multiplexed light input port for receiving a first multiplexed light and a second multiplexed light, the first multiplexed light having a first signal light of a signal wavelength and a first route control light of a first route control wavelength and the second multiplexed light having a second signal light of the signal wavelength and a second route control light of a second route control wavelength;
   a demultiplexer for demultiplexing the first and second signal lights of the signal wavelength, the first route control light, and the second route control light from the first and second multiplexed lights; and
   an interferometer optical switch having a first arm, a second arm, a first optical phase modulator disposed on the first arm, a second optical phase modulator disposed on the second arm, a first output port, and a second output port, wherein the interferometer applies a first portion of the first and second signal lights and the first route control light from the demultiplexer to the first optical phase modulator, applies a second portion of the first and second signal lights and the second route control light from the demultiplexer to the second optical phase modulator, outputs the first signal light through the first output port according to the first route control light, and outputs the second signal light through the second output port according to the second route control light, wherein the demultiplexer comprises:

a splitter for splitting the first and second multiplexed lights into three split outputs;

a first optical filter for extracting a light of the first route control wavelength from a first one of the three split outputs;

a second optical filter for extracting a light of the signal wavelength from a second one of the three split outputs; and a third optical filter for extracting a light of the second route control wavelength from a third one of the three split outputs, and wherein the interferometer optical switch comprises:

a signal light splitter for splitting the light of the signal wavelength from the demultiplexer into first and second portions and for applying the first portion to the first optical phase modulator and the second portion to the second optical phase modulator;

a first optical coupler for applying the light of the first route control wavelength from the demultiplexer to the first optical phase modulator in an opposite direction to that of the first portion from the signal light splitter;

a second optical coupler for applying the light of the second route control wavelength from the demultiplexer to the second optical phase modulator in an opposite direction to that of the second portion from the signal light splitter; and a coupler/splitter for coupling a first light of the signal wavelength from the first optical phase modulator and a second light of the signal wavelength from the second optical phase modulator into a coupled light, for splitting the coupled light into split lights, and for applying one portion of the split lights to the first output port and another portion of the split lights to the second output port.

5. The optical router of claim 4, wherein the first portion comprises the first signal light and the second portion comprises the second signal light.

6. The optical router of claim 4, wherein each of the first and the second optical phase modulators comprises a semiconductor optical amplifier.

7. An optical router comprising:

a multiplexed light input port for receiving a first multiplexed light and a second multiplexed light, the first multiplexed light having a first signal light of a signal wavelength and a first route control light of a first route control wavelength and the second multiplexed light having a second signal light of the signal wavelength and a second route control light of a second route control wavelength;

a demultiplexer for demultiplexing the first and second signal lights of the signal wavelength, the first route control light, and the second route control light from the first and second multiplexed lights; and an interferometer optical switch having a first arm, a second arm, a first optical phase modulator disposed on the first arm, a second optical phase modulator disposed on the second arm, a first output port, and a second output port, wherein the interferometer applies a first portion of the first and second signal lights and the first route control light from the demultiplexer to the first optical phase modulator, applies a second portion of the first and second signal lights and the second route control light from the demultiplexer to the second optical phase modulator, outputs the first signal light through the first output port according to the first route control light, and outputs the second signal light through the second output port according to the second route control light, wherein the interferometer optical switch comprises:

a signal light splitter for splitting the first and second signal lights from the demultiplexer into first and second portions and for applying the first portion to the first optical phase modulator and the second portion to the second optical phase modulator;

a first optical coupler for applying the first route control light from the demultiplexer to the first optical phase modulator in an opposite direction to that of the first portion from the signal light splitter;

a second optical coupler for applying the second route control light from the demultiplexer to the second optical phase modulator in an opposite direction to that of the second portion from the signal light splitter; and a coupler/splitter for coupling a first light of the signal wavelength from the first optical phase modulator and a second light of the signal wavelength from the second optical phase modulator into a coupled light, for splitting the coupled light into split light, and for applying one portion of the split lights to the first output port and another portion of the split lights to the second output port.

8. The optical router of claim 7, wherein the demultiplexer comprises:

a splitter for splitting the first and second multiplexed lights into three split outputs;

a first optical filter for extracting a light of the first route control wavelength from a first one of the three split outputs;

a second optical filter for extracting a light of the signal wavelength from a second one of the three split outputs; and a third optical filter for extracting a light of the second route control wavelength from a third one of the three split outputs.

9. An optical router comprising:

a multiplexed light input port for accepting a multiplexed light, the multiplexed light having a signal light of a signal wavelength and a control light, the control light comprising a first route control light of a first route control wavelength or a second route control light of a second route control wavelength;

a demultiplexer for demultiplexing the signal light of the signal wavelength and the control light from the multiplexed light; and an interferometer optical switch having a first arm, a second arm, a first optical phase modulator disposed on the first arm, a second optical phase modulator disposed on the second arm, a first output port, and a second output port, wherein the interferometer applies the signal light and the first route control light from the demultiplexer to the first optical phase modulator, applies the signal light and the second route control light from the demultiplexer to the second optical phase modulator, outputs the signal light through the first output port according to the first route control light, and outputs the signal light through the second output port according to the second route control light, wherein the interferometer optical switch comprises:

a signal light splitter for splitting the signal light from the demultiplexer into first and second portions and for applying the first portion to the first optical phase modulator and the second portion to the second optical phase modulator;

a first optical coupler for applying the first route control light from the demultiplexer to the first optical phase modulator in an opposite direction to that of the first portion of the signal light from the signal light splitter;

a second optical coupler for applying the second route control light from the demultiplexer to the second optical phase modulator in an opposite direction to that of the second portion of the signal light from the signal light splitter; and a coupler/splitter for coupling a first light of the signal wavelength from the first optical phase modulator and a second light of the signal wavelength from the second optical phase modulator into a coupled light, for splitting the coupled light into split lights, and for applying one portion of the split lights to the first output port and another portion of the split lights to the second output port.

10. The optical router of claim 9, wherein the demultiplexer demultiplexes signal light of the signal wavelength, the first route control light of the first route control wavelength, and the second route control light of the second route control wavelength from the multiplexed light.

11. The optical router of claim 7, wherein each of the first and the second optical phase modulators comprises a semiconductor optical amplifier.

* * * * *